Feb. 4, 1936.  J. B. ANDREWS, JR  2,029,978
GUTTER ATTACHMENT FOR VENTILATING WINDOWS OF MOTOR VEHICLES
Filed Oct. 29, 1934
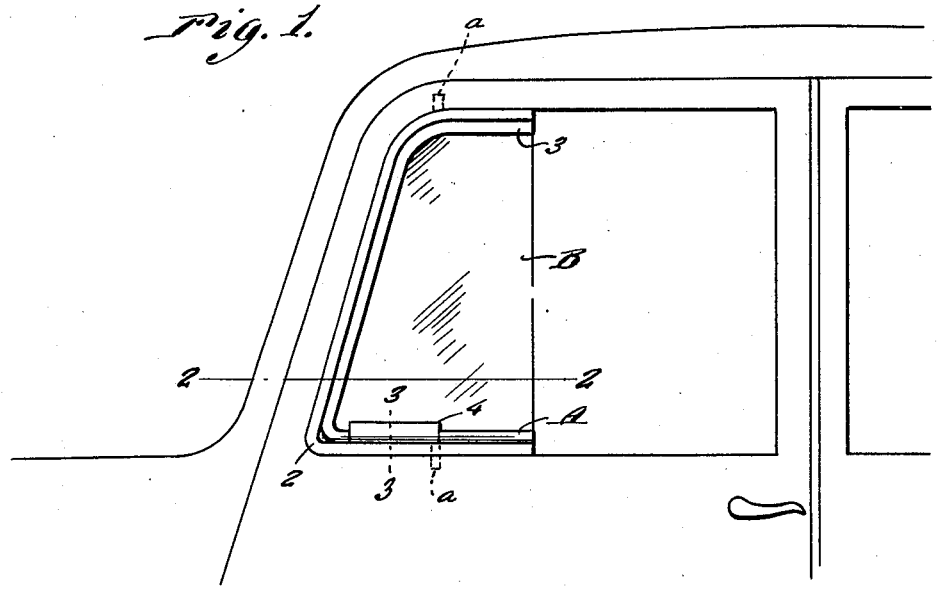
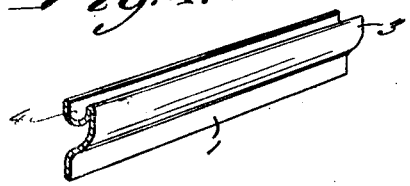
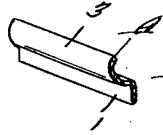
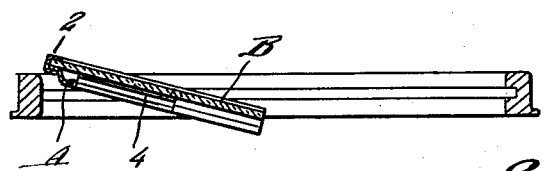
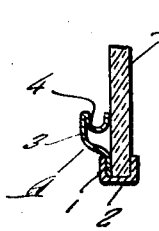
Inventor
J. B. Andrews, Jr.
By Clarence A. O'Brien
Attorney Patented Feb. 4, 1936

2,029,978

UNITED STATES PATENT OFFICE 2,029,978

GUTTER ATTACHMENT FOR VENTILATING WINDOWS OF MOTOR VEHICLES

Joseph Bolton Andrews, Jr., Newport, Ky.

Application October 29, 1934, Serial No. 750,586

4 Claims. (Cl. 296—44)

This invention relates to a gutter attachment for a ventilating window of an automobile, the general object of the invention being to prevent rain, dust, insects and the like striking the window from entering the window opening and thus reaching the interior of the body of the automobile.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Fig. 1 is a fragmentary elevation of an automobile showing the invention in use on the ventilating window thereof.

Fig. 2 is a section on line 2—2 of Fig. 1.

Fig. 3 is a section on line 3—3 of Fig. 1.

Fig. 4 is a perspective view of the double gutter part.

Fig. 5 is a similar view of the major part of the gutter member.

As shown in this drawing, I provide a gutter-forming member A which extends around the front, top and lower edges of the ventilating window B of an automobile, the pivots for the window being shown at $a$ in Fig. 1. The major portion of this gutter-forming member is provided with a flange 1 for fitting in the channel member 2 of the window, the flange being located between one limb of the channel and the glass as shown more particularly in Fig. 3. The rest of the gutter member curves outwardly as shown at 3 so as to provide a gutter between itself and the glass.

That part of the gutter-forming member between the lower pivot $a$ and the front lower corner of the window is provided with a U-shaped or second gutter-forming part 4 at its upper part, one limb of which is connected with the upper edge of the part 3 and its other edge being free but rests against the glass as shown in Fig. 3. Thus, when the front edge of the window is pressed inwardly as shown in Fig. 2 to provide ventilation for the interior of the car, some of the air currents at the front of the window will flow forwardly and enter the car between the front edge of the window and the window frame and usually rain, dust or insects carried by these air currents will enter the car. However, with my invention, these drops of moisture, dust and insects will be caught by the gutter-forming member and they will gravitate to the lower part of the gutter-forming member and when they reach this lower part, the air currents striking the rear portion of the window will cause the moisture or other matter to drop from the rear end of the lower part of the gutter-forming member.

By providing the upper gutter-forming member 4 between the lower pivots and the front lower corner of the window, the currents will be prevented from blowing the moisture forwardly out of the front portion of the lower part of the gutter-forming member into the car.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. In combination with a ventilating window of a motor vehicle, a gutter-forming member attached to the outer face thereof at the front, top and lower edges of the transparent member of the window that portion of the bottom part of the gutter forming member between the lower pivot of the window and the front lower corner thereof having an upper gutter forming member connected therewith.

2. In combination with a ventilating window of a motor vehicle, a gutter-forming member attached to the outer face thereof at the front, top and lower edges of the transparent member of the window, said gutter-forming member including a flange and an outwardly curved portion, the flange fitting in the frame of the window with the outwardly curved portion forming a gutter between itself and the transparent member, that portion of the bottom part of the gutter-forming member between the lower pivot of the window and the front lower corner thereof having an upper gutter-forming member connected therewith.

3. In combination with a ventilating window of a vehicle comprising a window panel pivoted on a vertical axis in said window, a gutter-forming member attached to the outer face thereof at the front and lower edges of the window panel, that portion of the bottom part of the gutter-forming member between the lower pivot of the window and the front lower corner thereof having an upper gutter forming member connected therewith.

4. In a ventilating device for vehicle bodies, the combination with a ventilating panel mounted in the window opening in a substantially vertical plane oblique to the plane of the window, of means for disposing of water collecting on the surface thereof, comprising a strip extending along the forward edge of said panel and projecting outwardly therefrom, and a tubular duct extending along the bottom edge of said panel and forming a continuation of said strip.

JOSEPH BOLTON ANDREWS, Jr.